US010936280B2

(12) United States Patent
Lin (10) Patent No.: US 10,936,280 B2
(45) Date of Patent: Mar. 2, 2021

(54) METHOD AND APPARATUS FOR ACCESSING MULTIMEDIA INTERACTIVE WEBSITE BY DETERMINING QUANTITY OF CHARACTERS IN VOICE SPECTRUM (71) Applicant: TENCENT TECHNOLOGY (SHENZHEN) COMPANY LIMITED, Shenzhen (CN)

(72) Inventor: Yu Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1061 days.

(21) Appl. No.: 15/177,369

(22) Filed: Jun. 9, 2016

(65) Prior Publication Data
US 2016/0283193 A1  Sep. 29, 2016

Related U.S. Application Data (63) Continuation of application No. PCT/CN2015/070706, filed on Jan. 14, 2015.

(30) Foreign Application Priority Data

Jan. 14, 2014 (CN) .......................... 201410015324.2

(51) Int. Cl.
*G06F 3/16* (2006.01)
*G06F 9/451* (2018.01)
(Continued)

(52) U.S. Cl.
CPC ................ *G06F 3/167* (2013.01); *G06F 3/01* (2013.01); *G06F 3/04847* (2013.01);
(Continued)

(58) Field of Classification Search
CPC ........ G06F 3/167; G06F 9/453; G06F 40/134; G06F 40/14; G06F 3/01; G06F 3/04847;
(Continued)

(56) References Cited

U.S. PATENT DOCUMENTS 6,101,472 A * 8/2000 Giangarra ............... G10L 15/22
704/275
6,208,965 B1 * 3/2001 Brown .................... G10L 15/22
455/563
(Continued)

FOREIGN PATENT DOCUMENTS

CN  101667188 A  3/2010
CN  102520792 A  6/2012
(Continued)

OTHER PUBLICATIONS

Larson, "VoiceXML and the W3C Speech Interface Framework", IEEE Multimedia, v. 10, n. 4, pp. 91-93, Oct. 2003.*
(Continued)

*Primary Examiner* — Beau D Spratt
(74) *Attorney, Agent, or Firm* — Brinks Gilson & Lione (57) ABSTRACT

Compiling selectable human computer interaction modes for at least one link on the multimedia interactive website, where the selectable human computer interaction modes at least include: a voice mode and a non-voice mode; monitoring a link to be accessed that is selected on the multimedia interactive website by a user, and identifying a human computer interaction mode that is selected by the user for the link to be accessed; when it is identified that the user selects the voice mode, jumping to a page used for guiding a user to provide a voice, guiding the user to provide a voice on the page, and acquiring voice data provided on the page by the user; and determining whether the voice data satisfies a set requirement for triggering the link to be accessed, and if yes,
(Continued)

providing information corresponding to the link to be accessed.

9 Claims, 4 Drawing Sheets

(51) Int. Cl.
| | | |
|---|---|---|
| *G06F 3/01* | (2006.01) | |
| *G06F 40/14* | (2020.01) | |
| *G06F 40/134* | (2020.01) | |
| *G06F 3/0484* | (2013.01) | |
| *G10L 17/14* | (2013.01) | |
| *G10L 17/22* | (2013.01) | |

(52) U.S. Cl.
CPC ............ *G06F 9/453* (2018.02); *G06F 40/134* (2020.01); *G06F 40/14* (2020.01); *G10L 17/14* (2013.01); *G10L 17/22* (2013.01); *G06F 2203/0381* (2013.01)

(58) Field of Classification Search
CPC .. G06F 2203/0381; G10L 17/14; G10L 17/22
See application file for complete search history.

(56) References Cited

U.S. PATENT DOCUMENTS

| | | | | |
|---|---|---|---|---|
| 6,282,511 | B1* | 8/2001 | Mayer | H04M 3/4938 704/270 |
| 6,330,539 | B1* | 12/2001 | Takayama | G10L 15/1822 704/275 |
| 6,629,077 | B1* | 9/2003 | Arling | G10L 15/26 704/270 |
| 6,633,846 | B1* | 10/2003 | Bennett | G06F 16/24522 704/257 |
| 6,788,768 | B1* | 9/2004 | Saylor | G06Q 10/10 379/265.02 |
| 7,016,848 | B2* | 3/2006 | St John Brittan | G10L 13/08 379/88.03 |
| 7,050,977 | B1* | 5/2006 | Bennett | G06F 17/2775 704/270.1 |
| 7,054,939 | B2* | 5/2006 | Koch | H04M 7/0027 709/227 |
| 7,203,721 | B1* | 4/2007 | Ben-Efraim | H04L 29/06027 709/203 |
| 7,650,284 | B2* | 1/2010 | Cross | G10L 15/26 704/270 |
| 7,962,842 | B2* | 6/2011 | Carro | G06F 17/245 715/205 |
| 8,060,371 | B1* | 11/2011 | Schaedler | G10L 15/26 704/270.1 |
| 9,288,321 | B2* | 3/2016 | Pujari | G06F 3/0481 |
| 9,536,067 | B1* | 1/2017 | Lee | G06F 21/31 |
| 2001/0054085 | A1* | 12/2001 | Kurganov | G06F 3/167 709/218 |
| 2002/0164000 | A1* | 11/2002 | Cohen | H04M 3/493 379/88.17 |
| 2002/0194300 | A1* | 12/2002 | Lin | G06F 17/289 709/217 |
| 2003/0061569 | A1* | 3/2003 | Aoki | G06F 17/24 715/234 |
| 2006/0206454 | A1* | 9/2006 | Forstall | G06F 16/951 |
| 2007/0192105 | A1* | 8/2007 | Neeracher | G10L 13/08 704/258 |
| 2008/0167860 | A1* | 7/2008 | Goller | G10L 15/28 704/201 |
| 2009/0030800 | A1* | 1/2009 | Grois | G06Q 30/02 705/14.52 |
| 2009/0055179 | A1* | 2/2009 | Cho | G10L 15/193 704/246 |
| 2010/0306153 | A1* | 12/2010 | Mu | G06F 16/9535 706/47 |
| 2011/0209041 | A1* | 8/2011 | Haq | G06F 3/167 715/208 |
| 2013/0031476 | A1* | 1/2013 | Coin | G06F 16/90332 715/706 |
| 2013/0110520 | A1* | 5/2013 | Cheyer | G10L 15/22 704/275 |
| 2013/0197908 | A1* | 8/2013 | Zhong | G06F 16/60 704/235 |
| 2013/0282381 | A1 | 10/2013 | Mauro et al. | |
| 2013/0283168 | A1* | 10/2013 | Brown | G06F 3/165 715/728 |
| 2015/0143241 | A1* | 5/2015 | Zeigler | G06F 16/957 715/728 |
| 2015/0162005 | A1 | 6/2015 | Mauro et al. | |
| 2016/0283193 | A1 | 9/2016 | Lin | |

FOREIGN PATENT DOCUMENTS

| | | |
|---|---|---|
| CN | 102567321 A | 7/2012 |
| CN | 103377028 A | 10/2013 |
| CN | 104123085 A | 10/2014 |

OTHER PUBLICATIONS

Larson, "W3C Speech Interface Languages: VoiceXML", IEEE Signal Processing Magazine, v. 24, n. 3, pp. 126-131, May 2007.*
Larson, "How to Converse with a Virtual Agent by Speaking and Listening Using Standard W3C Languages", http://www.larson-tech.com/Writings/VR.pdf, 2005.*
Lee et al., "MMDAGENT—A Fully Open-Source Toolkit for Voice Interaction Systems", 2013 IEEE International Conference on Acoustics, Speech and Signal Processing (ICASSP 2013), May 2013.*
Oviatt et al., "Designing the User Interface for Multimodal Speech and Pen-Based Gesture Applications: State-of-the-Art Systems and Future Research Directions", Human-Computer Interaction, v. 15, pp. 263-322, 2000.*
Office Action in CN Application No. 201410015324.2 dated Feb. 25, 2015, 7 pages, with concise statement of relevance.
International Search Report in International Application No. PCT/CN2015/070706 dated Apr. 17, 2015, 2 pages.
International Preliminary Report on Patentability and Written Opinion in International Application No. PCT/CN2015/070706 dated Jul. 19, 2016, 6 pages.

* cited by examiner

METHOD AND APPARATUS FOR ACCESSING MULTIMEDIA INTERACTIVE WEBSITE BY DETERMINING QUANTITY OF CHARACTERS IN VOICE SPECTRUM

PRIORITY CLAIM AND RELATED APPLICATION

This application is a continuation of International Application No. PCT/CN2015/070706 filed on Jan. 14, 2015, which claims priority to Chinese Patent Application No. 201410015324.2, entitled "METHOD AND APPARATUS FOR VOICE ACCESS TO MULTIMEDIA INTERACTIVE WEBSITE" filed on Jan. 14, 2014. The entire disclosures of each of the above applications are incorporated herein by reference.

FIELD OF THE INVENTION

The present application relates to network technologies, and in particular, to a method and an apparatus for voice access to a multimedia interactive website.

BACKGROUND OF THE INVENTION

At present, with the continuous development of website technologies, a great number of multimedia websites have emerged. Among these multimedia websites, a type of websites having a characteristic of strong human computer interaction is referred to as a multimedia interactive website in short.

A user interacts with a multimedia interactive website by using many modes, which include, but are not limited to, the following types:

1. Click trigger mode: For example, a user clicks a link on a multimedia interactive website by using a mouse to enter a webpage corresponding to the link.

2. Scroll wheel trigger mode: For example, a user triggers a link on a multimedia interactive website by using a scroll wheel in a mouse to enter a webpage corresponding to the link.

3. Keyboard trigger mode: For example, a user triggers a link on a multimedia interactive website by using a keyboard to enter a webpage corresponding to the link.

4. Touch control mode: For example, a user selects a link on a multimedia interactive website by touch control to enter a webpage corresponding to the link.

In the foregoing modes of interaction between a user and a multimedia interactive website, regardless of which mode is used, voice access of a user to a multimedia interactive website cannot be implemented.

Therefore, a method for implementing voice access of a user to a multimedia interactive website is a technical problem that needs to be solved urgently at present.

SUMMARY

The present application provides a method and an apparatus for voice access to a multimedia interactive website, so as to implement voice access of a user to a multimedia interactive website.

Technical solutions provided by the present application include:

A method for voice access to a multimedia interactive website, where the multimedia interactive website has a human computer interaction function, includes:

compiling selectable human computer interaction modes for at least one link on the multimedia interactive website, where the selectable human computer interaction modes at least include: a voice mode and a non-voice mode;

monitoring a link to be accessed that is selected on the multimedia interactive website by a user, and identifying a human computer interaction mode that is selected by the user for the link to be accessed;

when it is identified that the user selects the voice mode, jumping to a page used for guiding a user to provide a voice, guiding the user to provide a voice on the page, and acquiring voice data provided on the page by the user; and determining whether the voice data satisfies a set requirement for triggering the link to be accessed, and if yes, providing information corresponding to the link to be accessed.

An apparatus for voice access to a multimedia interactive website, where the multimedia interactive website has a human computer interaction function, and the apparatus is applied to a client of a multimedia website, includes:

a display unit, configured to display the multimedia interactive website, where at least one link on the multimedia interactive website is compiled with selectable human computer interaction modes, and the selectable human computer interaction modes at least include: a voice mode and a non-voice mode;

a monitoring unit, configured to monitor a link to be accessed that is selected on the multimedia interactive website by a user;

an identification unit, configured to identify a human computer interaction mode that is selected by the user for the link to be accessed;

a guiding unit, configured to: when the identification unit identifies that the user selects the voice mode, jump to a page used for guiding a user to provide a voice, guide the user to provide a voice on the page, and acquire voice data provided on the page by the user; and a determination unit, configured to determine whether the voice data satisfies a set requirement for triggering the link to be accessed, and if yes, provide information corresponding to the link to be accessed.

It can be seen from the above technical solutions that in the present disclosure, selectable human computer interaction modes are compiled by using a link on a multimedia interactive website, a link to be accessed that is selected on the multimedia interactive website by a user is monitored, and a human computer interaction mode that is selected by the user for the link to be accessed is identified; when it is identified that the user selects a voice mode, a page for guiding a user to provide a voice is jumped to; the user is guided to provide a voice on the page, and voice data provided on the page by the user is acquired; and it is determined whether the voice data satisfies a set requirement for triggering the link to be accessed, and if yes, information corresponding to the link to be accessed is provided, which can implement interaction between a user and a multimedia interactive website by using a voice mode in place of a conventional mode such as a mouse and a keyboard, and improve the efficiency of accessing the multimedia interactive website by the user.

DESCRIPTION OF EMBODIMENTS

To make the objectives, technical solutions, and advantages of the present disclosure more clear, the present disclosure is further described in detail below with reference to the accompanying drawings and specific embodiments.

The present application provides a method for voice access to a multimedia interactive website. Here, the multimedia interactive website has a human computer interaction function.

Figure 1:
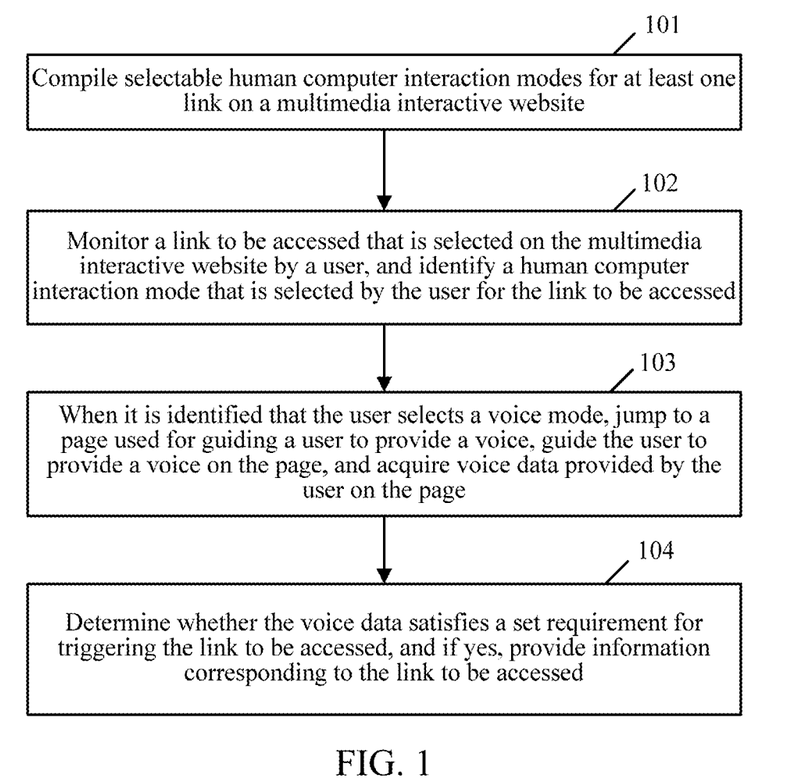
FIG. 1 is a flowchart of a method according to an embodiment of the present invention.

Referring to FIG. 1, FIG. 1 is a flowchart of a method provided by the present disclosure. As shown in FIG. 1, the procedure is applicable to a client, which includes the following steps:

Step 101: Compile selectable human computer interaction modes for at least one link on the multimedia interactive website.

Here, the multimedia interactive website is generally a website having a characteristic of strong human computer interaction. In the present disclosure, a few improvements are made to an existing multimedia interactive website, that is, selectable human computer interaction modes are compiled for all or some of links on the multimedia interactive website.

As an embodiment of the present invention, the selectable human computer interaction modes at least include: a voice mode and a non-voice mode.

Figure 2:
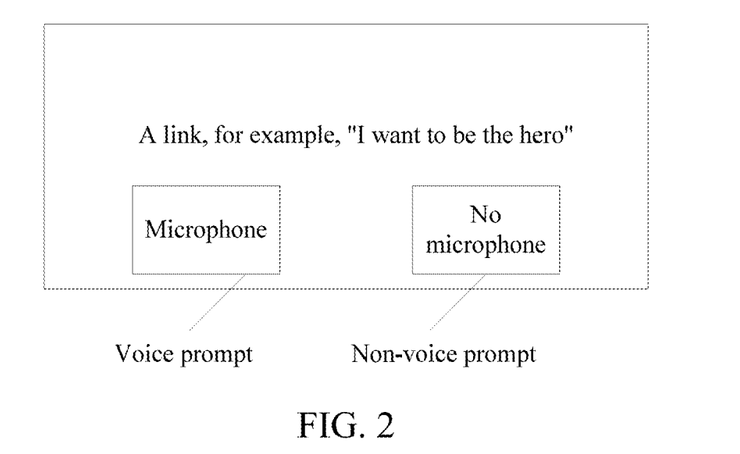
FIG. 2 is a schematic diagram of a link on a multimedia website according to an embodiment of the present invention.

As an embodiment of the present invention, the voice mode is implemented by using a prompt button used for indicating a microphone, whereas the non-voice mode is implemented by using a prompt button used for indicating no microphone. FIG. 2 shows selectable human computer interaction modes compiled on a link, for example, "I want to be the hero", on a multimedia interactive website.

Step 102: Monitor a link to be accessed that is selected on the multimedia interactive website by a user, and identify a human computer interaction mode that is selected by the user for the link to be accessed.

When the user enters the multimedia interactive website, the user selects, on the multimedia interactive website according to an interest of the user, the link to be accessed.

After the user finishing selecting, on the multimedia interactive website, the link to be accessed, based on the description in step 101, if the selectable human computer interaction modes are compiled for the link to be accessed, the user selects, from the selectable human computer interaction modes, an interaction mode to be used by the user, for example, selects the voice mode or selects the non-voice mode.

Step 103: When it is identified that the user selects the voice mode, jump to a page used for guiding a user to provide a voice, guide the user to provide a voice on the page, and acquire voice data provided on the page by the user.

Figure 3:
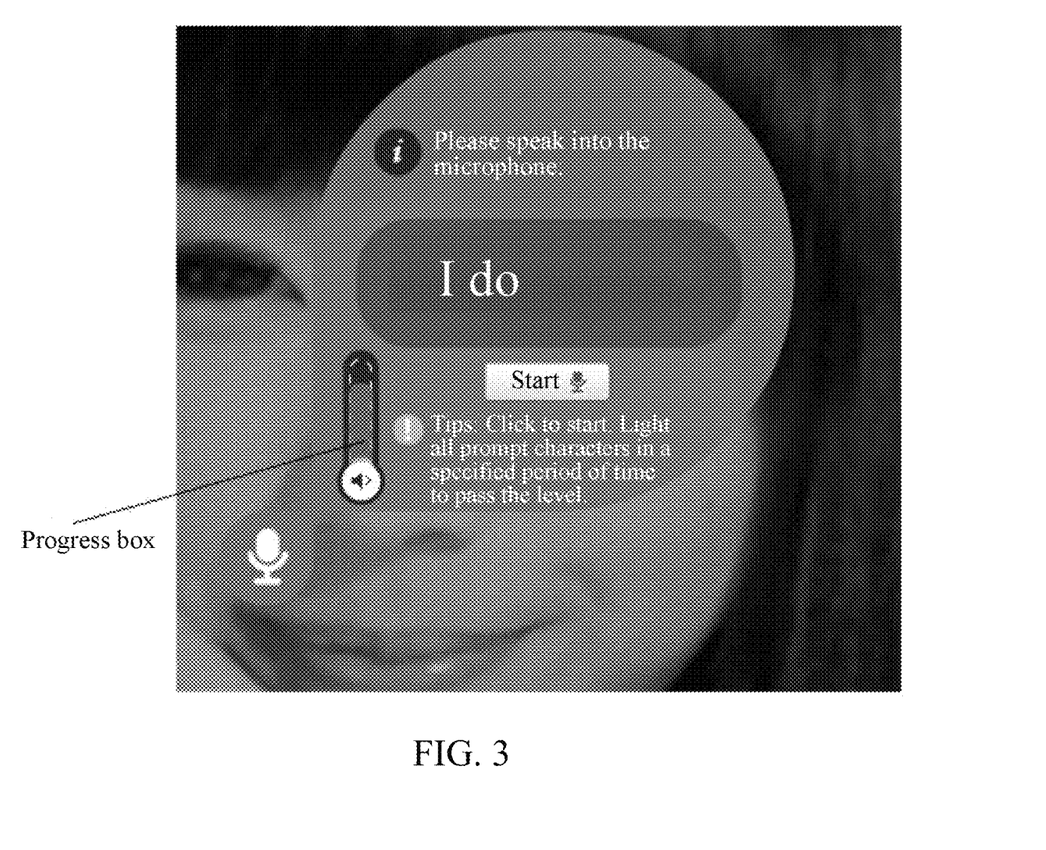
FIG. 3 is a schematic diagram of a page including a voice mode according to an embodiment of the present invention.

As an embodiment of the present invention, in step 103, the jumping to a page used for guiding a user to provide a voice includes:

displaying, in the form of an animation, a new page that is associated with the link to be accessed and is used for guiding a user to provide a voice, where the page includes guiding information for guiding a user to provide a voice. As shown in FIG. 3, FIG. 3 shows, in the form of an animation, a new page that is associated with a link to be accessed and is used for guiding a user to provide a voice. In the new page, "Please speak into the microphone:" is the guiding information and guides the user to provide voice data into the microphone. In addition, in FIG. 3, a progress box is further included and used for indicating a state of the user. When the user provides voice data into the microphone, a progress in this progress box changes dynamically, or otherwise, when the user stops providing voice data into the microphone, the progress in this progress box remains unchanged.

On the premise that a page that is jumped to includes the guiding information, in step 103, the guiding the user to provide a voice on the page may specifically be:

guiding, by using the guiding information in the page, the user to provide the voice on the page.

It should be noted that step 103 is performed on the premise that it is identified that the user selects the voice mode. However, if in the present disclosure, it is identified that the user selects the non-voice mode, the following steps may be performed:

prompting the user to trigger the link based on the set non-voice mode.

The non-voice mode is similar to an existing human computer interaction modes, and includes, but is not limited to, any one or any combination of the following modes:

a mouse;

a keyboard; and touch control.

Step 104: Determine whether the voice data satisfies a set requirement for triggering the link to be accessed, and if yes, provide information corresponding to the link to be accessed.

Preferably, as a preferred embodiment of the present invention, in step 104, when it is determined that the voice data does not satisfy the set requirement for triggering the link to be accessed, the user may be guided to provide a voice, and voice data provided on the page by the user is acquired, that is, the process returns to step 103.

Here, the procedure shown in FIG. 1 is completed.

It can be seen from the procedure shown in FIG. 1 that in the present disclosure, interaction between a user and a multimedia interactive website is implemented by using a voice mode in place of a conventional mode such as a mouse and a keyboard, which can improve the efficiency of accessing the multimedia interactive website by the user.

Preferably, as an embodiment of the present invention, in the foregoing description, the selectable human computer interaction modes compiled for the link on the multimedia interactive website may be compiled by using a Flash tool.

Based on that the selectable human computer interaction modes compiled for the link on the multimedia interactive website are compiled by using the Flash tool, in step 103 in the foregoing, the acquiring voice data provided on the page by the user may be:

acquiring, by using a sound application interface SOUNDMIXER API of the scripting language ACTIONSCRIPT in FLASH, the voice data provided on the page by the user.

Figure 4:
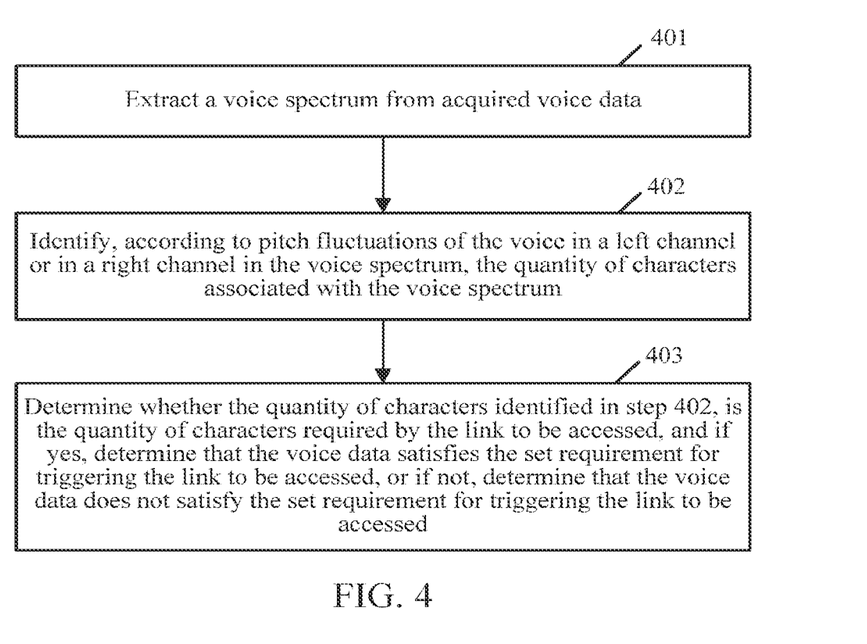
FIG. 4 is a flowchart of the implementation of step 104 according to an embodiment of the present invention.

In addition, in the present disclosure, as an embodiment of the present invention, the determining in step 104 may be implemented by using the procedure shown in FIG. 4.

Referring to FIG. 4, FIG. 4 is a flowchart of the implementation of step 104 according to an embodiment of the present invention. As shown in FIG. 4, the procedure may include the following steps:

Step 401: Extract a voice spectrum from the acquired voice data.

In the present disclosure, the acquired voice data is binary data. The extraction of the voice spectrum from the voice data formed of the binary data can be implemented by performing a fast Fourier transform (fft) on hidden Markov model (HMM) state-associated data.

Figure 5:
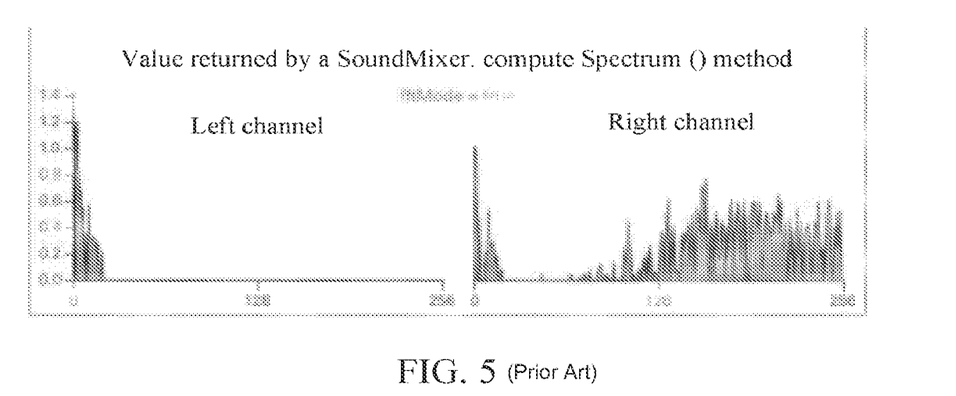
FIG. 5 is a schematic diagram of a voice spectrum according to an embodiment of the present invention.

The extracted voice spectrum is formed of a left channel and a right channel. FIG. 5 shows a voice spectrum when fftmode is true and FIG. 6 shows another voice spectrum when fftmode is false.

Figure 6:
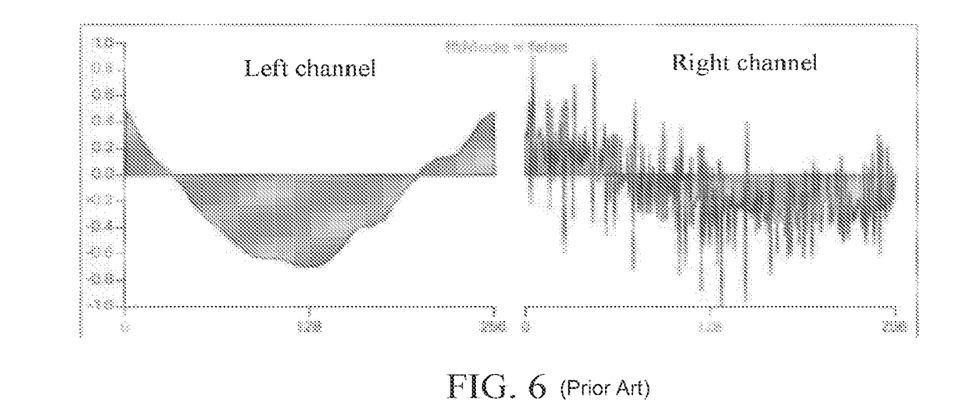
FIG. 6 is a schematic diagram of another voice spectrum according to an embodiment of the present invention.

It can be seen from the voice spectrum shown in FIG. 5 or FIG. 6 that the voice spectrum may be formed of a left channel and a right channel.

Step 402: Identify, according to pitch fluctuations of the voice in a left channel or in a right channel in the voice spectrum, the quantity of characters associated with the voice spectrum.

In the present disclosure, for the quantities of characters identified from different channels in the voice spectrum, the results are same, and therefore, a single channel, for example, the left channel or the right channel can be selected to identify the quantity of characters associated with the voice spectrum.

Specifically, in a voice spectrum, two voices of different pitch fluctuations are two different Chinese characters. Based on this, the quantity of characters associated with the voice spectrum is identified, according to a principle that two voices of different pitch fluctuations are two different Chinese characters, from the pitch fluctuations of the voice in the left channel or in the right channel in the voice spectrum.

Step 403: Determine whether the quantity of characters identified in step 402 is the quantity of characters required by the link to be accessed, and if yes, determine that the voice data satisfies the set requirement for triggering the link to be accessed, or if not, determine that the voice data does not satisfy the set requirement for triggering the link to be accessed.

If the quantity of characters required by the link to be accessed is 3, it is determined in step 403 whether the quantity of characters identified in step 402 is 3, and if yes, it is determined that the voice data satisfies the set requirement for triggering the link to be accessed, or if not, it is determined that the voice data does not satisfy the set requirement for triggering the link to be accessed.

Therefore, the procedure shown in FIG. 4 is completed.

It can be seen that, the determining whether the voice data satisfies a set requirement for triggering the link to be accessed in step 104 can be implemented by using the procedure shown in FIG. 4. However, it should be noted that the procedure shown in FIG. 4 is only an example of determining whether the voice data satisfies the set requirement for triggering the link to be accessed and is not intended to limit the present disclosure.

A person skilled in the art may further use other modes to determine whether the voice data satisfies the set requirement for triggering the link to be accessed. Two examples below are merely used for illustration:

EXAMPLE 1

Whether set voice data exists in the acquired voice data is identified based on an existing voice recognition system. If the set voice data is "I do", whether "I do" exists in the acquired voice data is identified based on the existing voice recognition system, and if yes, it is determined that the voice data satisfies the set requirement for triggering the link to be accessed, or if not, it is determined that the voice data does not satisfy the set requirement for triggering the link to be accessed.

EXAMPLE 2

Example 2 is mainly a combination of the procedure shown in FIG. 1 and the procedure shown in FIG. 4, that is, whether set voice data exists in the acquired voice data is first identified based on the existing voice recognition system, and the procedure shown in FIG. 4 is performed only when it is identified that the set voice data exists in the acquired voice data, or otherwise, it is determined that the voice data does not satisfy the set requirement for triggering the link to be accessed. According to Example 2, the link to be accessed can be more accurately triggered according to a user requirement.

Therefore, the description of the method provided by the present disclosure is completed.

Figure 7:
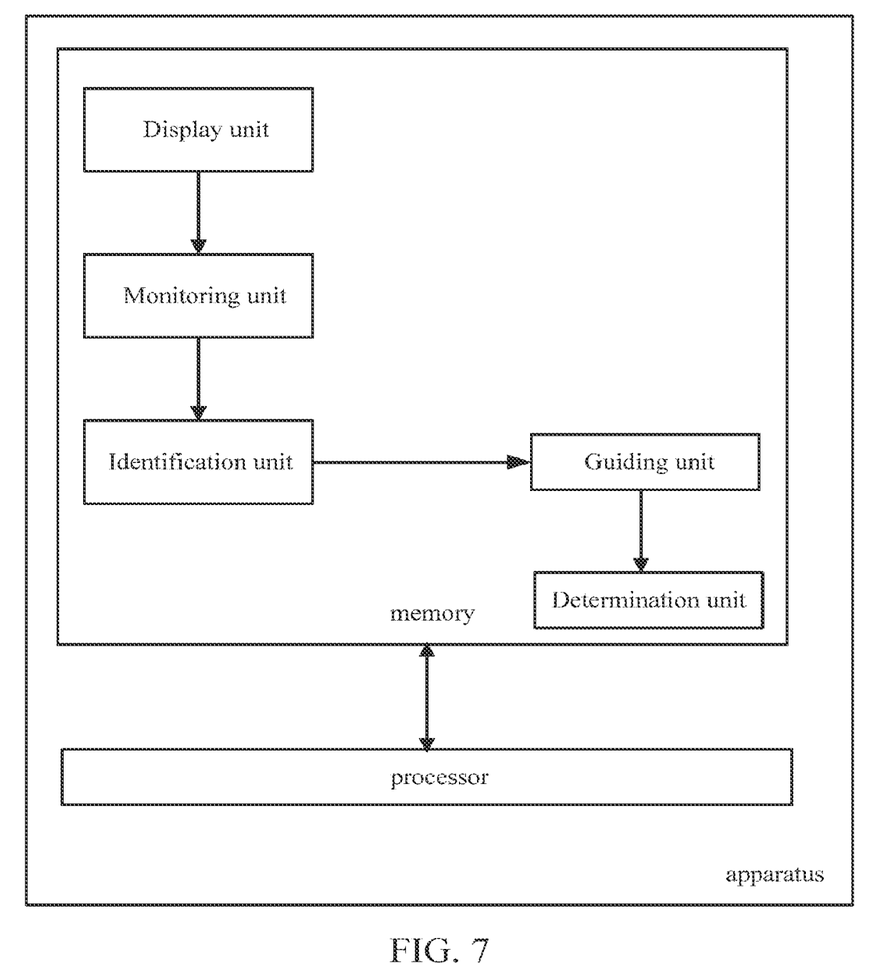
FIG. 7 is a structural diagram of an apparatus according to an embodiment of the present invention.

The apparatus provided by the present disclosure is described below:

Referring to FIG. 7, FIG. 7 is a structural diagram of an apparatus according to an embodiment of the present invention. The apparatus is applied to a client of a multimedia interactive website, where the multimedia interactive website has a human computer interaction function. As shown in FIG. 7, the apparatus may include a memory and a processor in communication with the memory, in which the memory stores a display unit, a monitoring unit, an identification unit, a guiding unit and a determination unit, when being executed by the processor, the display unit displays the multimedia interactive website, where at least one link on the multimedia interactive website is compiled with selectable human computer interaction modes, and the selectable human computer interaction modes at least include: a voice mode and a non-voice mode;

the monitoring unit monitors a link to be accessed that is selected on the multimedia interactive website by a user;

the identification unit identifies a human computer interaction mode that is selected by the user for the link to be accessed;

the guiding unit: when the identification unit identifies that the user selects the voice mode, jumps to a page used for guiding a user to provide a voice, guides the user to provide a voice on the page, and acquires voice data provided on the page by the user; and the determination unit determines whether the voice data satisfies a set requirement for triggering the link to be accessed, and if yes, provides information corresponding to the link to be accessed.

Preferably, as an embodiment of the present invention, the jumping to a page used for guiding a user to provide a voice includes:

displaying, in the form of an animation, a new page that is associated with the link to be accessed and is used for guiding a user to provide a voice, where the page includes guiding information for guiding a user to provide a voice.

Based on this, the guiding the user to provide a voice on the page includes:

guiding, by using the guiding information in the new page, the user to provide the voice on the page.

Preferably, in the present disclosure, the determining whether the voice data satisfies a set requirement for triggering the link to be accessed includes:

extracting a voice spectrum from the voice data, where the voice spectrum is formed of a left channel and a right channel;

identifying, according to pitch fluctuations of the voice in the left channel or in the right channel in the voice spectrum, the quantity of characters associated with the voice spectrum; and determining whether the quantity of characters is the quantity of characters required by the link to be accessed, and if yes, determining that the voice data satisfies the set requirement for triggering the link to be accessed, or if not, determining that the voice data does not satisfy the set requirement for triggering the link to be accessed.

Preferably, in the present disclosure, the voice mode is implemented by using a prompt button used for indicating a microphone; and the non-voice mode is implemented by using a prompt button used for indicating no microphone.

Preferably, in the present disclosure, the link on the multimedia interactive website is compiled by using Flash; and the voice data is acquired by using a sound application interface SoundMixer API of the scripting language ActionScript in Flash.

Therefore, the description of the apparatus shown in FIG. 7 is completed.

The present disclosure also provides a non-transitory computer-readable medium for voice access to a multimedia interactive website, comprising instructions stored thereon, that when executed on a processor, perform the steps of:

compiling selectable human computer interaction modes for at least one link on the multimedia interactive website, wherein the selectable human computer interaction modes at least comprise: a voice mode and a non-voice mode;

monitoring a link to be accessed that is selected on the multimedia interactive website by a user, and identifying a human computer interaction mode that is selected by the user for the link to be accessed;

when it is identified that the user selects the voice mode, jumping to a page used for guiding a user to provide a voice, guiding the user to provide a voice on the page, and acquiring voice data provided on the page by the user; and determining whether the voice data satisfies a set requirement for triggering the link to be accessed, and if yes, providing information corresponding to the link to be accessed.

When being executed on a processor, the instructions stored on the non-transitory computer-readable medium may further execute steps described above according to various embodiments of the present disclosure, which will not be described herein repeatedly.

It can be seen from the above technical solutions that in the present disclosure, selectable human computer interaction modes are compiled for a link on a multimedia interactive website, a link to be accessed that is selected on the multimedia interactive website by a user is monitored; a human computer interaction mode that is selected by the user for the link to be accessed is identified; when it is identified that the user selects a voice mode, a page for guiding a user to provide a voice is jumped to; the user is guided to provide a voice on the page, and voice data provided on the page by the user is acquired; and it is determined whether the voice data satisfies a set requirement for triggering the link to be accessed, and if yes, information corresponding to the link to be accessed is provided, which can implement interaction between a user and a multimedia interactive website by using a voice mode in place of a conventional mode such as a mouse and a keyboard, and improve the efficiency of accessing the multimedia interactive website by the user.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A method for voice access to a multimedia interactive website, wherein the multimedia interactive website includes a human computer interaction function, and the method comprises:

compiling selectable human computer interaction modes for at least one link on the multimedia interactive website, wherein the selectable human computer interaction modes comprise a voice mode;

monitoring a link to be accessed on the multimedia interactive website, and identifying a human computer interaction mode that is selected by a user for the link to be accessed;

in response to identifying that the user selects the voice mode, jumping to a page that prompts the user to provide a voice input, and acquiring voice data corresponding to the voice input of the user;

displaying the page with guiding information that is used for guiding the user to provide the voice input;

determining whether the voice data satisfies a set requirement for triggering the link to be accessed;

wherein the determining whether the voice data satisfies a set requirement for triggering the link to be accessed comprises:

extracting a voice spectrum from the voice data, wherein the voice spectrum is formed of a left channel and a right channel;

identifying, according to pitch fluctuations of the voice input in the left channel or in the right channel in the voice spectrum, the quantity of characters associated with the voice spectrum; and determining whether the quantity of characters is the quantity of characters required by the link to be accessed, and in response to a determination that the quantity of characters is the quantity of characters required by the link to be accessed and without determining whether the voice data matches a set of characters associated with the link, determining that the voice data satisfies the set requirement for triggering the link to be accessed and triggering the link to enter a webpage corresponding to the link, or, in response to a determination that the quantity of characters is not the quantity of characters required by the link to be accessed and without determining whether the voice data matches the set of characters associated with the link, determining that the voice data does not satisfy the set requirement for triggering the link to be accessed.

2. The method according to claim 1, wherein the jumping to a page used for guiding a user to provide a voice input further comprises:
guiding, by using the guiding information in the page, the user to provide the voice input.

3. The method according to claim 1, wherein,
the voice mode is triggered by using a graphical user interface (GUI) prompt button used for indicating a microphone; and
the selectable human computer interaction modes further comprise a non-voice mode triggered by using a GUI prompt button used for indicating no microphone.

4. An apparatus for voice access to a multimedia interactive website, wherein the multimedia interactive website includes a human computer interaction function and the apparatus is applied to a client of a multimedia website, comprising:
a memory and a processor in communication with the memory, wherein the memory stores a display unit, a monitoring unit, an identification unit, a guiding unit and a determination unit, when being executed by the processor,
the display unit displays the multimedia interactive website, wherein at least one link on the multimedia interactive website is compiled with selectable human computer interaction modes, and the selectable human computer interaction modes comprise a voice mode;
the monitoring unit monitors a link to be accessed on the multimedia interactive website;
the identification unit identifies a human computer interaction mode that is selected by the user for the link to be accessed;
the guiding unit: when the identification unit identifies that the user selects the voice mode, jumps to a page that prompts the user to provide a voice input, and acquires voice data corresponding to the voice input of the user, wherein the display unit displays the page with guiding information that is used for guiding the user to provide the voice input;
the determination unit determines whether the voice data satisfies a set requirement for triggering the link to be accessed;
wherein the determining whether the voice data satisfies a set requirement for triggering the link to be accessed comprises:
extracting a voice spectrum from the voice data, wherein the voice spectrum is formed of a left channel and a right channel:
identifying, according to pitch fluctuations of the voice in the left channel or in the right channel in the voice spectrum, the quantity of characters associated with the voice spectrum: and
determining whether the quantity of characters is the quantity of characters required by the link to be accessed,
and in response to a determination that the quantity of characters is the quantity of characters required by the link to be accessed and without a determination whether the voice data matches a set of characters associated with the link, determining that the voice data satisfies the set requirement for triggering the link to be accessed and triggering the link to enter a webpage corresponding to the link, or in response to a determination that the quantity of characters is not the quantity of characters required by the link to be accessed and without a determination whether the voice data matches the set of characters associated with the link, determining that the voice data does not satisfy the set requirement for triggering the link to be accessed.

5. The apparatus according to claim 4, wherein the jumping to a page used for guiding a user to provide a voice input further comprises:
guiding, by using the guiding information in the page, the user to provide the voice input.

6. The apparatus according to claim 4, wherein the voice mode is implemented triggered by using a graphical user interface (GUI) prompt button used for indicating a microphone; and
the selectable human computer interaction modes further comprise a non-voice mode triggered by using a prompt button used for indicating no microphone.

7. A non-transitory computer-readable medium for voice access to a multimedia interactive website, comprising instructions stored thereon, that when executed on a processor, perform steps comprising:
compiling selectable human computer interaction modes for at least one link on the multimedia interactive website, wherein the selectable human computer interaction modes comprise a voice mode;
monitoring a link to be accessed on the multimedia interactive website by a user, and identifying a human computer interaction mode that is selected by the user for the link to be accessed;
in response to identifying that the user selects the voice mode, jumping to a page that prompts the user to provide a voice input, and acquiring voice data corresponding to the voice input of the user;
displaying the page with guiding information that is used for guiding the user to provide the voice input;
determining whether the voice data satisfies a set requirement for triggering the link to be accessed;
wherein when executed on the processor, the instructions are further to perform steps comprising:
extracting a voice spectrum from the voice data, wherein the voice spectrum is formed of a left channel and a right channel;
identifying, according to pitch fluctuations of the voice in the left channel or in the right channel in the voice spectrum, the quantity of characters associated with the voice spectrum; and
determining whether the quantity of characters is the quantity of characters required by the link to be accessed,
and in response to a determination that the quantity of characters is the quantity of characters required by the link to be accessed and without determining whether the voice data matches a set of characters associated with the link, determining that the voice data satisfies the set requirement for triggering the link to be accessed and triggering the link to enter a webpage corresponding to the link, or
in response to a determination that the quantity of characters is not the quantity of characters required by the link to be accessed and without determining whether the voice data matches the set of characters associated with the link, determining that the voice data does not satisfy the set requirement for triggering the link to be accessed.

8. The non-transitory computer-readable medium according to claim 7, wherein when executed on the processor, the instructions are further to perform steps comprising of:
 guiding, by using the guiding information in the page, the user to provide the voice input.

9. The non-transitory computer-readable medium according to claim 7, wherein,
 the voice mode is triggered by using a graphical user interface (GUI) prompt button used for indicating a microphone; and
 the selectable human computer interaction modes further comprise a non-voice mode triggered by using a GUI prompt button used for indicating no microphone.

* * * * *